(No Model.)
E. V. CLEMENS.
PIPE JOINT.
No. 437,019. Patented Sept. 23, 1890.
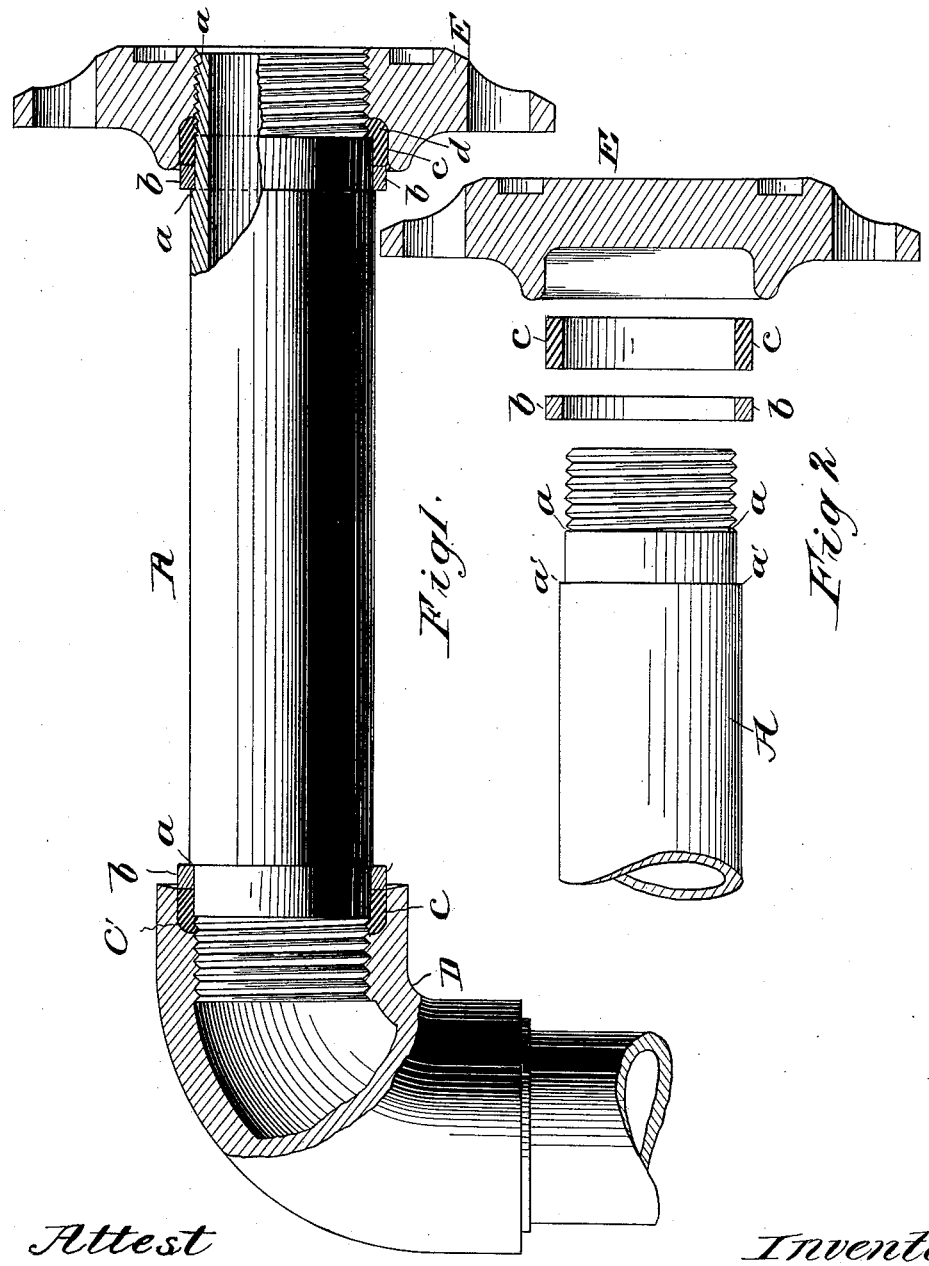

UNITED STATES PATENT OFFICE.

ERNEST V. CLEMENS, OF NEW YORK, N. Y., ASSIGNOR TO THE DE LA VERGNE REFRIGERATING MACHINE COMPANY, OF NEW YORK.

PIPE-JOINT.

SPECIFICATION forming part of Letters Patent No. 437,019, dated September 23, 1890.

Application filed April 7, 1890. Serial No. 346,901. (No model.)

*To all whom it may concern:*

Be it known that I, ERNEST V. CLEMENS, a citizen of the United States, residing in the city of New York, county and State of New York, have invented certain new and useful Improvements in Pipe-Joints, of which the following is such a full, clear, concise, and exact description as will enable others skilled in the art to which my invention appertains to make and use the same, reference being had to the accompanying drawings, forming part of this specification.

My invention particularly relates to those kinds of joints in which the connecting-pipe ends are forced against a cast-leaden or soft-metal gasket, so as to crush the latter and form a tight joint, the object of my invention being to provide a joint that will be particularly secure and tight, yet at the same time readily fitted and easy to uncouple when desired; and the invention consists in the construction and arrangement of the parts hereinafter more fully described, and pointed out in the claim.

In the accompanying drawings, Figure 1 is a view of a pipe, partially in section, showing joints embodying my improvement, one end of the pipe being coupled to an elbow, while the other shows a straight connection by the use of ordinary fittings. Fig. 2 shows the parts separated.

To form the improved joint the ends $a\ a$ of the pipe A to be coupled are threaded a sufficient distance and beyond the threaded portions are shoulders $a'\ a'$. Around the pipe and bearing against these shoulders are placed metal, preferably wrought-iron, rings $b\ b$, outside of which are strung gaskets $c\ c$, made of lead or other suitable soft metal or alloy. The socket or faucet ends of the elbow D or fittings E are threaded to receive the threaded ends $a\ a$, and preferably provided with annular spaces or grooves $d$ and $e'$ to admit the gaskets. Grooves formed specially to receive the gaskets are, however, not absolutely necessary, as the metal rings $b\ b$, bearing against the shoulders $a'\ a'$, will force the soft lead of the gaskets $c\ c$ into any vacant spaces between the pipe and socket, thus effecting a tight joint, by which liability of leakage is avoided.

Having described my invention, what I claim as new, and desire to secure by Letters Patent, is—

A pipe-joint consisting of a pipe provided with a threaded end and a shoulder, a ring fitted over said pipe and bearing against said shoulder, and a gasket of soft metal bearing against said ring, in combination with a connecting pipe or fitting provided with a threaded socket adapted to receive said threaded end, whereby when the parts are secured together the ring bearing against the shoulder forces the soft metal of the gasket into the vacant spaces between the pipe and socket, substantially as described.

ERNEST V. CLEMENS.

Witnesses:
WM. J. SCHWEITZER,
MATT. P. LULLY.